US011054709B2

(12) United States Patent
Nakagawa

(10) Patent No.: US 11,054,709 B2
(45) Date of Patent: Jul. 6, 2021

(54) DISPLAY PANEL AND DISPLAY DEVICE

(71) Applicant: SAKAI DISPLAY PRODUCTS CORPORATION, Sakai (JP)

(72) Inventor: Hidetoshi Nakagawa, Sakai (JP)

(73) Assignee: SAKAI DISPLAY PRODUCTS CORPORATION, Sakai (JP)

( * ) Notice: Subject to any disclaimer, the term of this patent is extended or adjusted under 35 U.S.C. 154(b) by 0 days.

(21) Appl. No.: 16/479,567

(22) PCT Filed: Jan. 24, 2017

(86) PCT No.: PCT/JP2017/002400
§ 371 (c)(1),
(2) Date: Jul. 19, 2019

(87) PCT Pub. No.: WO2018/138784
PCT Pub. Date: Aug. 2, 2018

(65) Prior Publication Data
US 2020/0050035 A1   Feb. 13, 2020

(51) Int. Cl.
G02F 1/1368 (2006.01)
G02F 1/1362 (2006.01)

(52) U.S. Cl.
CPC ...... G02F 1/1368 (2013.01); G02F 1/136286 (2013.01); G02F 2201/123 (2013.01); G09G 2310/0286 (2013.01); G09G 2320/0223 (2013.01)

(58) Field of Classification Search
CPC .......... G02F 1/13452; G02F 1/136286; G09G 2310/0286; G09G 2320/0223
See application file for complete search history.

(56) References Cited

U.S. PATENT DOCUMENTS

2003/0227078 A1* 12/2003 Chang ................... G02F 1/1345
257/693
2011/0074743 A1* 3/2011 Son .......................... G09G 3/20
345/204
2016/0124550 A1* 5/2016 Tada ......................... H05K 1/03
345/173

FOREIGN PATENT DOCUMENTS

JP   2003-005670 A   1/2003

* cited by examiner

Primary Examiner — Alexander P Gross
(74) Attorney, Agent, or Firm — ScienBiziP, P.C.

(57) ABSTRACT

A display panel (300) equipped with a display region (301) in which a plurality of switching elements (303) are positioned, a plurality of supply circuits (10) which supply a scanning signal the switching elements (303) and are arranged in a first direction in the periphery of the display region (301), a plurality of first signal lines (11, 12, 13, 14) which supply a prescribed signal to the supply circuits (10), extend in the first direction, and are arranged in a second direction which intersects the first direction, and a plurality of second signal lines (40, 41) which supply the prescribed signal to the supply circuits (10) and connect the first signal lines (11, 12, 13, 14) and the supply circuits (10) to one another, the display panel (300) being characterized in that some of the second signal lines (40, 41) have a meandering section (4a) that meanders in the portion thereof that overlaps the connected first signal lines (12, 13, 14).

5 Claims, 8 Drawing Sheets

DISPLAY PANEL AND DISPLAY DEVICE

TECHNICAL FIELD

The present invention relates to a display panel and a display device.

BACKGROUND ART

In recent years, a liquid-crystal display (LCD) that is a representative of flat display panels is widely used not only in the fields of medium and small-scale panels but also in the field of large-scale panels such as those used in televisions. An active-matrix display device is widely used among such liquid-crystal displays.

The display panel of the active-matrix display device includes elements such as a plurality of source bus lines, a plurality of gate bus lines, and pixel forming sections. The pixel forming sections are provided in a display region of the display panel at locations where the source bus lines and the gate bus lines intersect, and form a matrix. Each pixel forming section includes a switching element and a pixel electrode connected to the switching element. The display panel displays an image in the display region by supplying a scanning signal and a data signal to the pixel forming sections through the gate bus lines and the source bus lines.

The display panel includes a plurality of shift registers which are arranged side by side in a column direction on one side of the display region and which supply the scanning signal to the switching elements through the gate bus lines. The display panel also includes a plurality of first signal lines and a plurality of second signal lines. The first signal lines extend in the column direction, are arranged side by side in a row direction, and supply signals such as a clock signal to the respective shift registers. The second signal lines connect the first signal lines to the shift registers and supply the signal.

Because the distances from the shift registers to the first signal lines duller from one another, the lengths of the second signal lines connecting the shift registers to the first signal lines differ from one another. Therefore, resistance differences between the second signal lines increase, which may hinder favorable transmission of the signal. Herein, a technique for reducing the resistance differences between the gate bus lines by meandering the gate bus lines is disclosed in Patent Literature 1. Similar to the technique disclosed in Patent Literature 1, the lengths of the second signal lines can also be adjusted by providing meandering portions in the second signal lines which meander between a supply circuit and the first signal lines to adjust the resistance differences between the second signal lines.

CITATION LIST

Patent Literature

[Patent Literature 1]
Japanese Patent Application Laid-Open Publication No. 2003-005670

SUMMARY OF INVENTION

Technical Problem

However, in a case where the meandering portions are provided, a region in which the shift registers can be formed becomes narrow to ensure a region in which the meandering portions are arranged. Accordingly, the elements of the shift registers are designed to be small when attempting to narrow the bezel of the display panel. Therefore, semiconductors of the elements degrade easily, and display defects in the display panel may readily occur.

The present disclosure has been made in view of such circumstances, and aims to provide a display panel and a display device capable of preventing occurrence of display defects.

Solution to Problem

A display panel according to an embodiment of the present disclosure includes: a display region in which a plurality of switching elements is arranged; a plurality of supply circuits arranged side by side in a first direction along a periphery of the display region which supply a scanning signal to the switching elements; a plurality of first signal lines extending in the first direction, arranged side by side in a second direction intersecting with the first direction, which supply prescribed signals to the respective supply circuits; and a plurality of second signal lines which connect the first signal lines to the supply circuits and which supply the prescribed signals to the respective supply circuits. Some of the second signal lines have meandering portions which meander in parts where the some of the second signal lines overlap with first signal lines of the first signal lines to which the some of the second signal lines are connected.

Advantageous Effects of Invention

According to the embodiment of the present disclosure, occurrence of a display defect can be prevented.

DESCRIPTION OF EMBODIMENTS

The following describes embodiments of the present disclosure in detail with reference to the drawings.

First Embodiment

Figure 1:
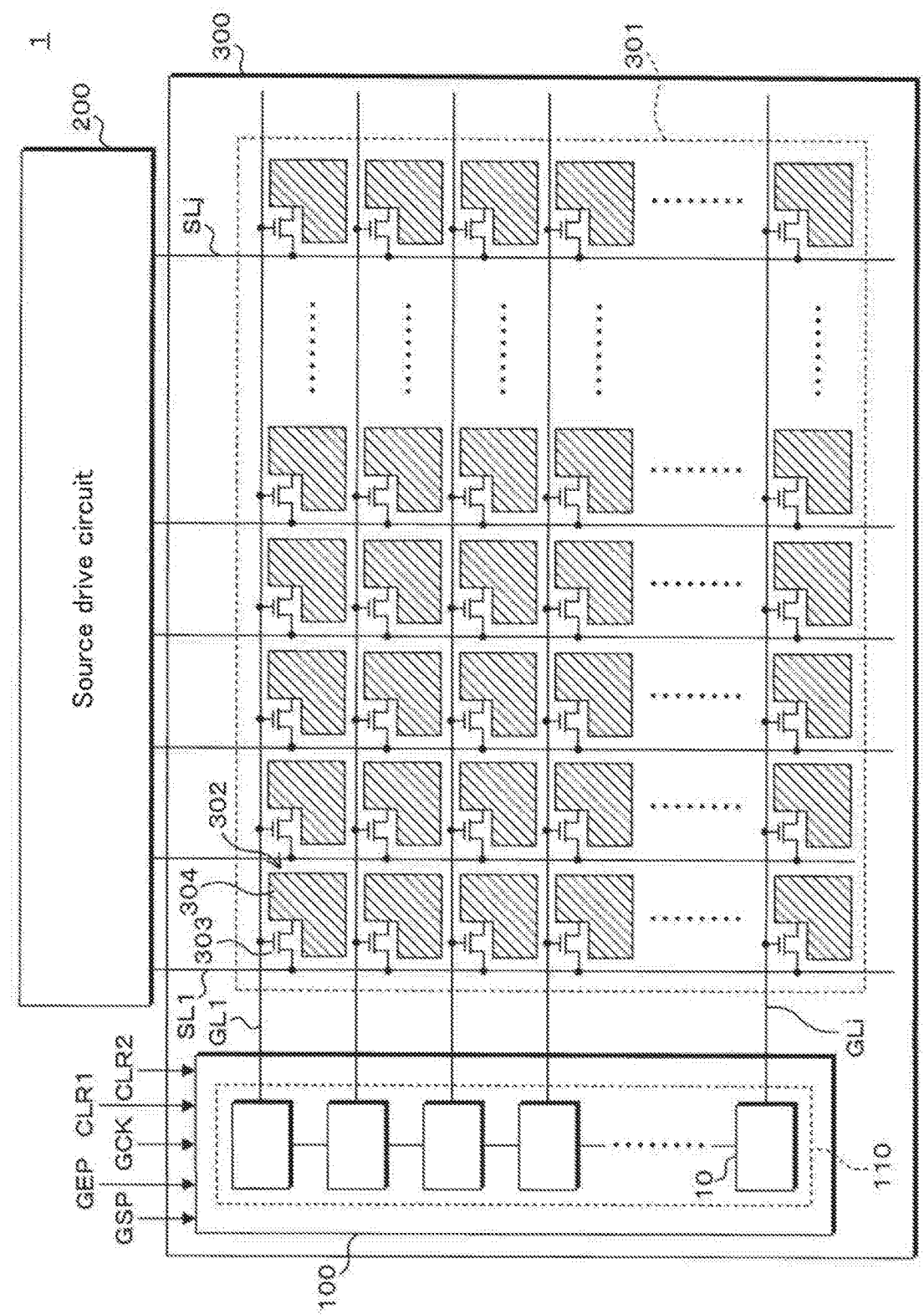
FIG. 1 is a schematic illustration of a main portion of a display device according to a first embodiment.

FIG. 1 is a schematic illustration of a main portion of a display device according to a first embodiment. The display device of the first embodiment is an active-matrix display device 1, for example. As illustrated in FIG. 1, the display device 1 includes elements such as a gate driver 100, a source drive circuit 200, and a display panel 300.

An edge portion of the display panel 300 is a non-display region, and the display panel 300 has a display region 301 positioned in the center excluding the non-display region.

The gate driver 100 is formed of for example amorphous silicon, polycrystalline silicon, microcrystalline silicon, or an oxide semiconductor along a periphery of the display region 301 on the display panel 300, that is, in the non-display region on the display panel 300. More specifically, the gate driver 100 is formed on a translucent active-matrix substrate 305 (referred to in the following as a thin-film transistor (TFT) substrate 305, refer to FIG. 5) included in the display panel 300. Note that in FIG. 1, the display device 1 includes a gate driver positioned on one side (an end portion in a row direction) of the display region 301. However, the present disclosure is not limited hereto, and the display device 1 may include two gate drivers arranged in the non-display region such that the display region 301 is interposed therebetween. The display panel 300 further includes elements such as a color filter substrate opposite to the TFT substrate 305 and a liquid crystal layer positioned between the TFT substrate 305 and the color filter substrate.

A plurality (j in FIG. 1) of source bus lines SL1 to SLj connects the display region 301 to the source drive circuit 200 by way of a source driver (chip on film (COF)). A plurality (i in FIG. 1) of gate bus lines GL1 to GLi also connects the display region 301 to the gate driver 100.

In the display region 301, pixel forming sections 302 are provided in locations where the source bus lines and the gate bus lines intersect. The pixel forming sections 302 are arranged in a matrix, and each include a TFT 303 and a pixel electrode 304 connected to the TFT 303. The pixel electrode 304 forms a pixel capacitor which ensures a pixel voltage value together with a counter electrode (unillustrated) opposite to the pixel electrode 304 with the liquid crystal layer (unillustrated) therebetween. A gate electrode of the TFT 303 is connected to a corresponding gate bus line, and a source electrode of the TFT 303 is connected to a corresponding source bus line. A drain electrode of the TFT 303 is connected to the pixel electrode 304.

The source drive circuit 200 outputs a data signal to the source bus lines SL1 to SLj based on signals such as a digital video signal, a source start pulse signal, and a source clock signal output from an unillustrated display control circuit.

The gate driver 100 receives input of a gate start pulse signal GSP, a gate end pulse signal GEP, a clock signal GCK, a first clear signal CLR1, and a second clear signal CLR2 output from the unillustrated display control circuit. The gate driver 100 outputs a scanning signal to the gate bus lines GL1 to GLi in the stated order through a plurality of shift registers 10 constituting the gate driver 100, based on signals such as the input GSP, GEP, GCK, CLR1, and CLR2. Through the above, the scanning signal is supplied to the TFTs 303, For the sake of convenience, the clock signal GCK collectively represents clock signals of multiple phases as one signal. Note that output of the scanning signal to the gate bus lines GL1 to GLi is repeated at each vertical scanning period.

Figure 2:
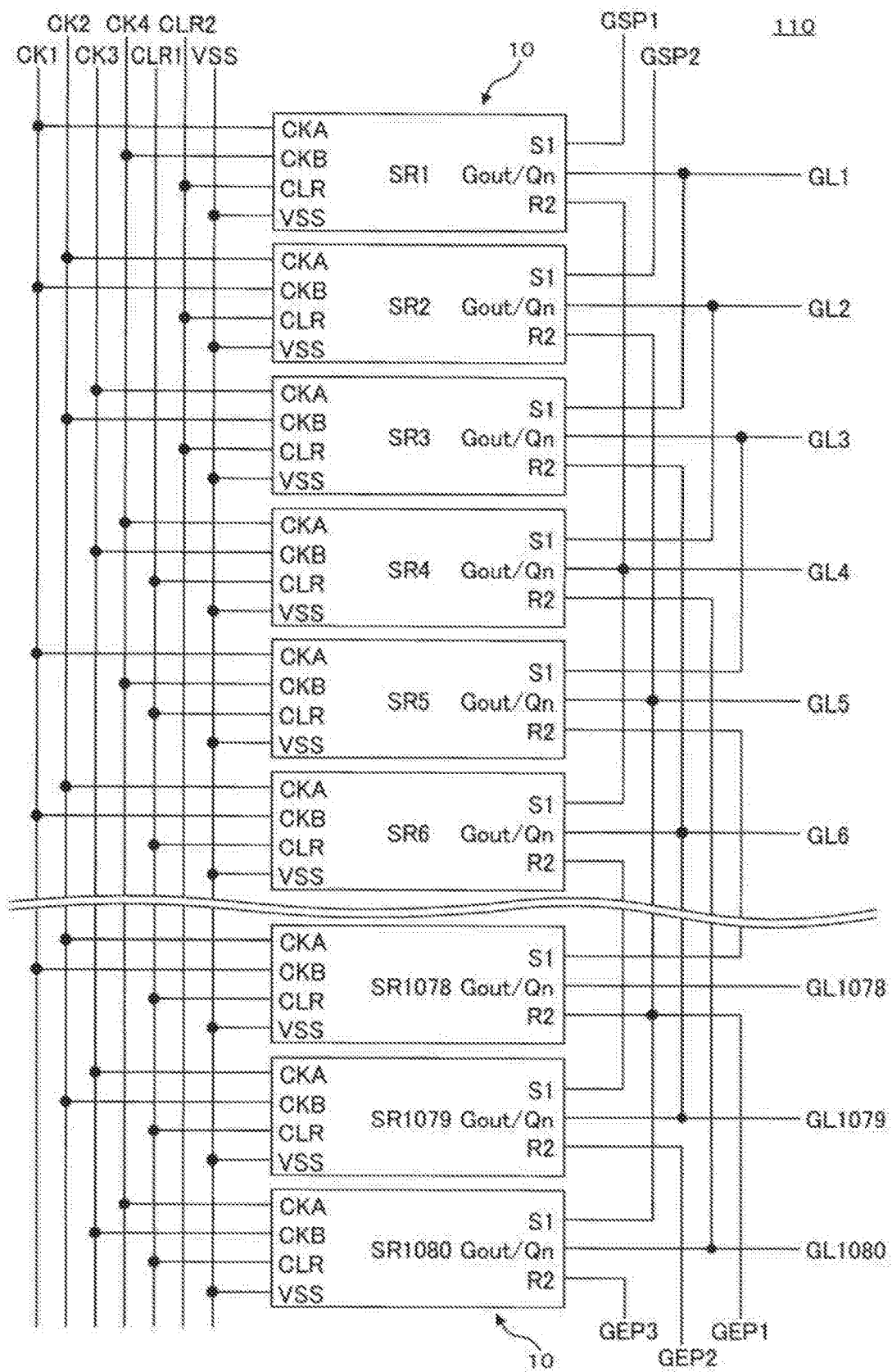
FIG. 2 is a block diagram illustrating a connection state a plurality of shift registers.
Figure 3:
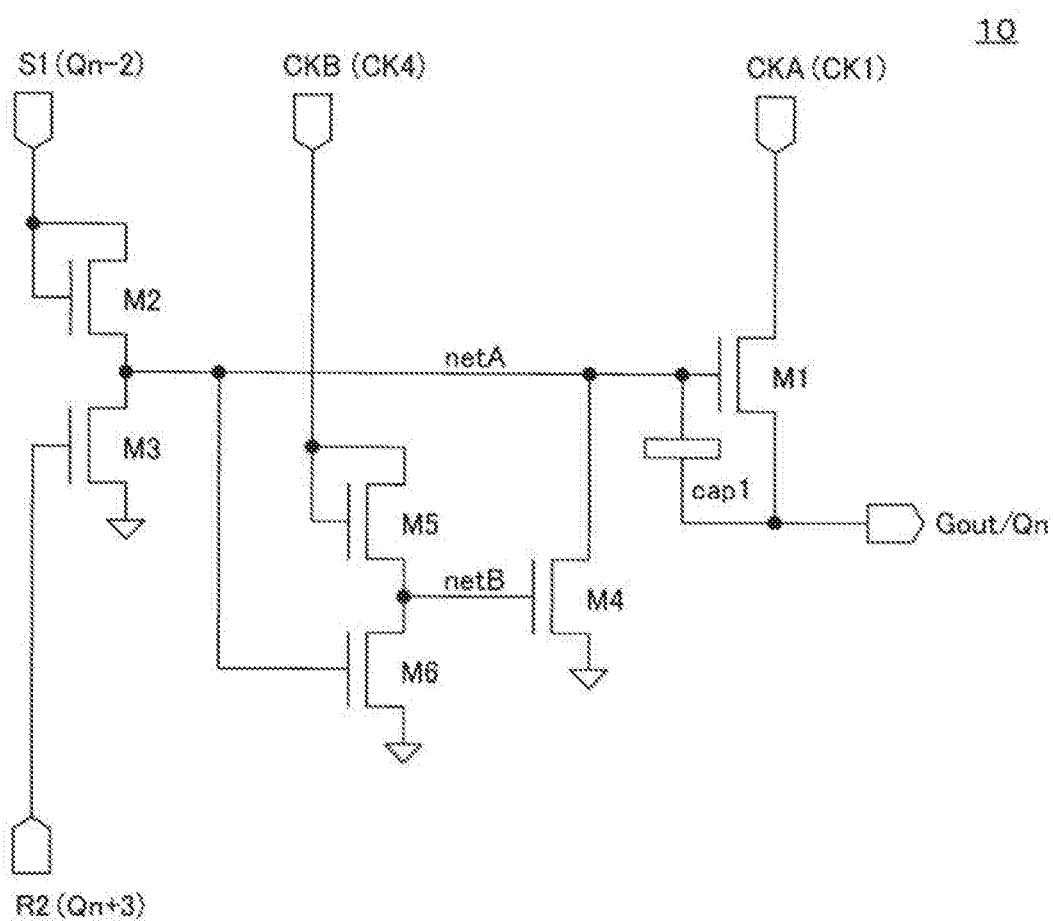
FIG. 3 is a circuit diagram illustrating a configuration of a shift register.
Figure 4:
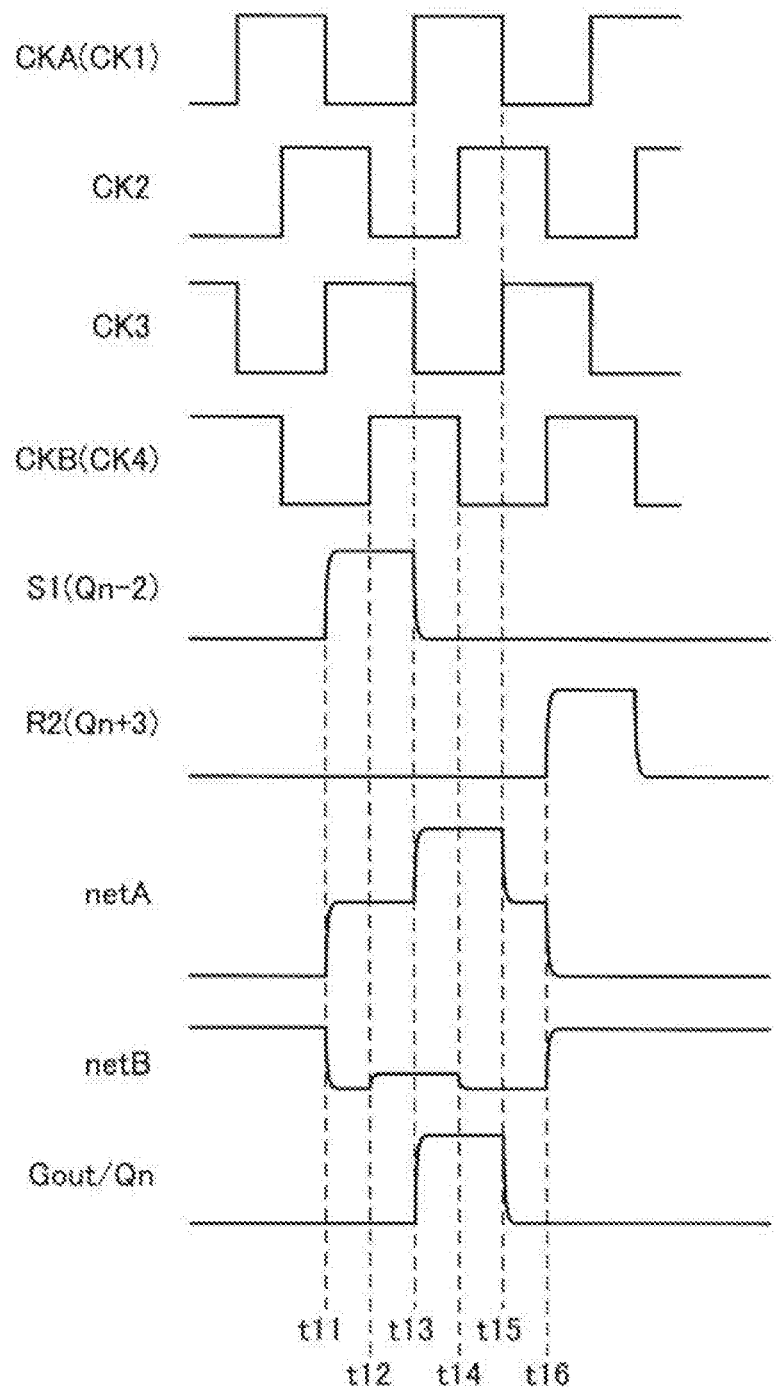
FIG. 4 is a timing diagram illustrating operation of the shift registers.

The gate driver 100 includes a shift register group 110 in which the shift registers 10 are connected to each then FIG. 2 is a block diagram illustrating a connection state of the shift registers 10. FIG. 3 is a circuit diagram illustrating a configuration of a shift register 10. FIG. 4 is a timing diagram illustrating operation of the shift register 10.

In the case of a full high-definition (FHD, 1920×1080) display device for example, the gate driver 100 includes 1080 (1080 stages of) shift registers SR1 to SR1080 as illustrated in FIG. 2. Note that the number of shift registers is not limited to 1080, and may be 1081 (1081 stages) or 1082 (1082 stages) to accommodate dummy lines provided on either or both of the top and bottom of the display region 301, for example. In the case of an ultra-high-definition (UHD, 3840×2160) display device, 2160 (2160 stages of) shift registers may be included. In an FHD display device, 3240 (3240 stages of) shift registers may be included in a case where red, green, and blue (KGB) are horizontally striped (vertically stacked). Each of the shift registers 10 includes input and output terminals for CKA, CKB, CLR, VSS, S1, Gout/Qn, and R2, for example. In FIG. 2, an example of the gate driver 100 is illustrated that performs operation with a four-phase clock signal.

As illustrated in FIG. 3, each shift register 10 includes TFTs M1 to M6 and one capacitor cap1. More specifically, the shift register 10 includes elements such as: an output TFT M1 of which a drain receives input of a prescribed clock signal CKA and of which a source outputs a drive signal to an output node (Gout/Qn); a first input TFT M2 of which a gate receives input of a prescribed set signal S1 (output Qn−2 of a shift register two stages previous to the current shift register), of which a source is connected to the gate of the output TFT M1, and of which a drain is connected to the gate of the first input TFT M2; and a second input TUFT M3 of which a drain is connected to an output control node (netA) to which the source of the first input TFT M2 and the gate of the output TFT M1 is connected, of which a source is connected to a prescribed potential, and of which a gate receives input of a prescribed reset signal R2 (output Qn+3 of a shift register three stages following the current shift register), The capacitor cap1 is connected to the gate and the source of the output TFT M1.

The shift register 10 further includes: a TFT M4 (prescribed switching element) of which a drain is connected to the output control node (netA), of which a source is connected to a prescribed potential, and of which a gate is connected to a prescribed node (referred to as netB); a TFT M5 of which a gate receives input of a prescribed clock signal CKB, of which a source is connected to netB, and of which a drain is connected to the gate of the TFT M5; and a TFT M6 of which a drain is connected to netB, of which a source is connected to a prescribed potential, and of which a gate is connected to the output control node (netA).

The four-phase clock signal includes four clock signals CK1, CK2, CK3, and CK4. The four-phase clock signal is constituted by the four clock signals which each have a phase shifted by a quarter period. Referring to FIG. 4, it is understood that the phases of the clock signals CK1, CK2, CK3, and CK4 are offset from each other. A period equivalent to the offset of the phases is a prescribed horizontal scan period, and is represented as a single horizontal scan period (1H).

The terminals CKA and CKB of each shift register 10 receive input of any two of the four clock signals CK1, CK2, CK3, and CK4 according to the stage to which the shift register 10 is connected among the first to 1080th stages. The terminal CLR of each shift register 10 receives input of any one of two clear signals CLR1 (first clear signal) and CLR2 (second clear signal) according to the stage to which the shift register 10 is connected.

The scanning signals (GL1 to GL1080) are output from the terminals Gout/Qn of the shift registers 10. The terminal S1 of each shift register 10 receives input of the scanning signal (Qn−2) of two stages previous to the current shift register 10, However, the terminals S1 of the shift registers 10 (SR1 to SR2) of the first and second stages receive input of gate start pulse signals GSP1 and GSP2, respectively, instead of the scanning signal (Qn−2) of two stages previous. The gate start pulse signal GSP is a signal which starts operation of one or more shift registers (prescribed shift registers) on a previous stage side of the shift registers. Note that the gate start pulse signals GSP1 and GSP2 may also be collectively referred to as GSP.

The terminal R2 of each shift register 10 receives input of the scanning signal (Qn+3) of three stages following the current shift register 10. However, the terminals R2 of the last three shift registers 10 (SR1078 to SR1080) on the 1078th to 1080th stages receive input of gate end pulse signals GEP1 to GEP3, respectively, instead of the scanning signal (Qn+3) of three stages following. The gate end pulse signals GEP1 to GEP3 are signals which cease operation of one or more shift registers (prescribed shift registers) on a following stage side of the shift registers, and may also be referred to as a shift register operation ceasing signal. A prescribed potential is applied to the terminal VSS of each shift register 10. Note that the gate end pulse signals GEP1 to GEP3 may also be collectively referred to as GEP.

Herein, an example of operation of a shift register 10 is described in a case where CK1 is input to CKA and CK4 is input to CKB. When the set signal S1 is input at time t11 as illustrated in FIG. 4, the first input TFT M2 turns on and the capacitor cap1 is charged (precharged). Through the above, the potential of the output control node (netA) changes from low level to high level and the output TFT M1 turns on. By contrast, while the set signal S1 is at high level between times t11 and t13 (also referred to as a set period), the potential of the output node (Gout/Qn) is kept at low level because the clock signal CKA is at low level.

At time t13, the set signal S1 changes from high level to low level. The second input TFT M3 is off because the reset signal R2 is at low level. Therefore, the output control node (netA) enters a floating state. Also at time t13, when the clock signal CKA changes from low level to high level, the potential of the output control node (netA) increases (is bootstrapped by netA) along with an increase in potential of the drain of the output TFT M1 because the charge charged to the capacitor cap1 maintains the potential difference between the output control node (netA) and the output node (Gout). At this time, the output TFT M1 is kept on and the potential of the output node (Gout/Qn) increases. A period between time t13 and later described time t15 may also be referred to as a selection period.

At time t15, the clock signal CKA changes from high level to low level. At time t15, the potential of the output node (Gout/Qn) decreases along with a decrease in the potential of the drain of the output TFT M1 because the output ITT M1 is on. The potential of the output control node (netA) also decreases along with the decrease in the potential of the output node (Gout/Qn).

At time t16, when the reset signal R2 changes from low level to high level, the second input TFT M3 turns on and the potential of the output control node (netA) decreases to low level. A period in which the reset signal R2 is at high level is also referred to as a reset period. Note that in the example in FIG. 3, a case is described in which time t15 and time t16 differ, but time t15 and time t16 may be the same time.

By contrast, while the output control node (netA) in the shift register 10 is at low level, the TFTs M4, M5, and M6 are caused to operate so that netB becomes high level. The TFTs M4, M5, and M6 stabilize the output control node (netA) at low level. As illustrated in FIG. 4, netB is at high level before time t11 and after time t16. Through the above, the TFT M4 turns on and keeps the potential of the output control node (netA) at the potential of the source of the TFT M4. The TFT M5 turns on at time t12 when CKB becomes high level and turns off at time t14 when CKB becomes low level. At this time, M6 prevents an increase in netB.

Figure 5:
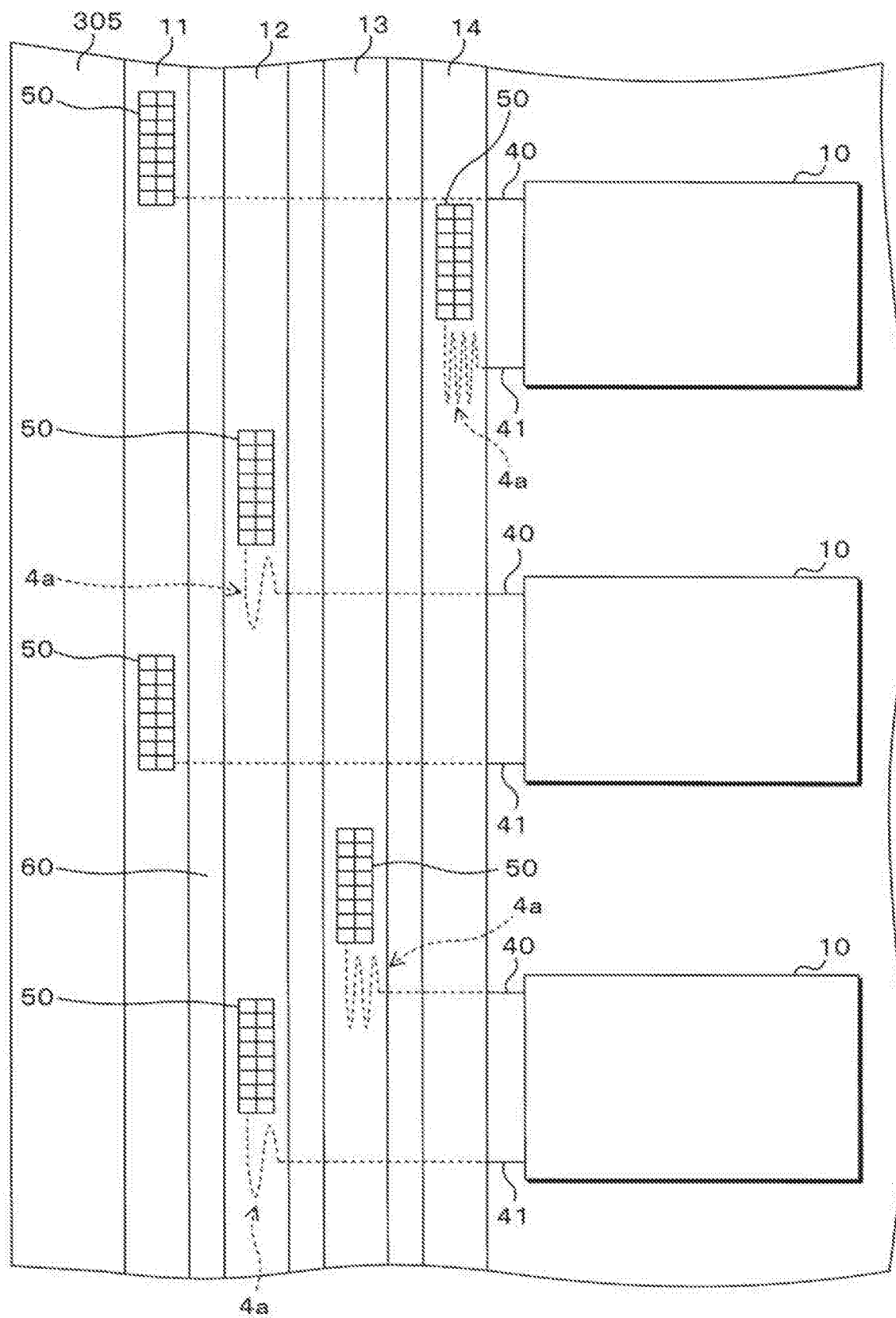
FIG. 5 is a schematic illustration of a connection state between the shift registers and first signal lines.

FIG. 5 is a schematic illustration of a connection state between the shift registers 10 and first signal lines. The display panel 300 includes a plurality of first signal lines 11, 12, 13, and 14 Which supply the clock signals CK1 to CK4. Note that in FIG. 5, only a part equivalent to some of the first signal lines 11 to 14 and the corresponding shift registers 10 is illustrated, and the other part is omitted from the diagram. Also in FIG. 5, the terminals of the shift registers 10 are omitted.

The first signal lines 11, 12, 13, and 14 are arranged outward from the shift registers 10 on the edge portion of the display panel 300, extend in a column direction (up-and-down direction in FIG. 5), and are arranged side by side in a row direction (left-right direction in FIG. 5). The first signal line 11 is positioned farthest outward (farthest from the shift registers 10). The first signal line 12 is positioned inward from the first signal line 11. The first signal line 13 is positioned inward from the first signal line 12. The first signal line 14 is positioned farthest inward. The first signal lines 11, 12, 13, and 14 are also connected to the unillustrated display control circuit.

Each of the illustrated shift registers 10 are connected to any of the first signal lines 11 to 14 through second signal lines 40 and 41. The second signal lines 40 and 41 extend parallel to each other in the row direction and are arranged side by side in the column direction. An insulating layer 60 is arranged between the first signal lines 11 to 14 and the second signal lines 40 and 41. The first signal lines 11 to 14 are positioned on an upper side of the insulating layer 60 (obverse direction to the sheet of FIG. 5), and the second signal lines 40 and 41 are positioned on a lower side of the insulating layer 60 (reverse direction to the sheet of FIG. 5).

In connection locations of the first signal lines 11 to 14 and the second signal lines 40 and 41, a plurality of contact holes 50 is arranged in the column direction. The second signal lines 40 and 41 are positioned beneath the first signal lines 11 to 14. The contact holes 50 electrically connect the second signal lines 40 and 41 to each first signal line 11 to 14, and the clock signals CK1 to CK4 are supplied to the shift registers 10 through the first signal lines 11 to 14 and the second signal lines 40 and 41. The second signal lines 40 and 41 extend in the column direction along the contact holes 50 in parts where the second signal lines 40 and 41 connect to the contact holes 50.

Here, as illustrated in FIG. 5, some of the second signal lines 40 and 41 have meandering portions 4a, and the other second signal lines 40 and 41 are linear and do not have meandering portions. Specifically, the second signal lines 40 and 41 which are connected to the first signal line 11 located farthest outward are linear and do not have meandering portions. By contrast, the second signal lines 40 and 41 connected to the first signal lines 12 to 14 have meandering portions 4a.

The meandering portions 4a are positioned at parts where the second signal lines 40 and 41 overlap with the first signal lines 12 to 14 to which the second signal lines 40 and 41 are connected. The meandering portions 4a of the second signal lines 40 and 41 connected to the first signal line 14 are longer than the meandering portions 4a of the second signal lines 40 and 41 connected to the first signal line 13. The meandering portions 4a of the second signal lines 40 and 41 connected to the first signal line 13 are longer than the meandering portions 4a of the second signal lines 40 and 41 connected to the first signal line 12. That is, of the first signal lines 14, the farther inward (closer to the display region 301 and the shift registers 10) the position of a first signal line is, the longer the meandering portions 4a of a second signal line 40 and 41 connected to the first signal line are.

Here, the length of each meandering portion 4a is adjusted through the number of bends in the meandering. That is, of the first signal lines 12 to 14, the further inward the position of a first signal line to which the second signal lines 40 and 41 are connected, the larger the number of bends there are in the meandering portions 4a of the second signal lines 40 and 41. Note that the adjustment of the length of the meandering portions 4a is not limited to adjustment based on the number of bends, and may be done based on the angle of the bends or by any other scheme in addition to these, such as based on line width of the second signal lines (in the bent part).

Note that the meandering portions 4a are not limited to the aspect as illustrated in FIG. 5 in which the meandering portions 4a bend repetitively in the column direction and extend as a whole in the row direction. Other aspects are possible such as an aspect in which the meandering portions 4a bend repetitively in the row direction and extend as a whole in the column direction.

Through the shift registers 10 operating as described above, the gate driver 100 outputs the scanning signal to the display panel 300. Through the source drive circuit 200 outputting the source signal to the display panel 300, the display panel 300 displays a prescribed image in the display region 301.

According to the above configuration, resistance difference between the second signal lines 40 and 41 of the display panel 300 can be decreased by adjusting the length of the meandering portions 4a. Also, the meandering portions 4a are positioned at parts where the second signal lines 40 and 41 with the meandering portions 4a overlap with the first signal lines 12 to 14 to which the second signal lines 40 and 41 are connected. Accordingly, the space between the shift registers 10 and the first signal line 14 need not be widened to provide a region in which the meandering portions 4a of the second signal lines 40 and 41 are arranged. Through the above, elements of the shift registers 10 can be formed larger by enlarging the formation region of the shift registers 10 up to the edge of the first signal line 14, thereby preventing degradation of the semiconductors. Through the above, occurrence of a display defect in the display panel 300 can be prevented.

The length of the meandering portions 4a of one of the second signal lines 40 and 41 is adjusted according to the length of the other of the second signal lines 40 and 41 connected to the first signal line 11. Through the above, the resistance difference between the second signal lines 40 and 41 can be more favorably reduced.

Of the first signal lines 12 to 14, the farther inward the position of a first signal line is, the longer the meandering portions 4a of the second signal lines 40 and 41 connected to the first signal line are. Because the length of the meandering portions 4a is adjusted according to the distance between the first signal lines 12 and 14 and the shift registers 10, the resistance difference of the second signal lines 40 and 41 can be more favorably reduced.

While different signals flow in the first signal lines 12 to 14, the second signal lines 40 and 41 and the first signal lines 12 to 14 connected to the second signal lines 40 and 41 through contact holes 50 adjacent to the meandering portions 4a of the second signal lines 40 and 41 transmit the same signal. Accordingly, a malfunction does not occur even in a case where a second signal line 40 or 41 has short-circuited with a corresponding one of the first signal lines 12 to 14 in any meandering portion 4a. Furthermore, a case where a break has occurred in any meandering portion 4a can also be addressed with a melt connection to a first signal line 12 to 14 overlapping with the meandering portion 4a.

Second Embodiment

In a second embodiment, aspects such as the structure of the first signal lines and the arrangement of the second signal lines differ from those of the first embodiment. Elements in the configuration of the display device 1 according to the second embodiment that are the same as those in the configuration of the first embodiment are labeled with the same reference numerals and detailed description thereof is not repeated.

Figure 6:
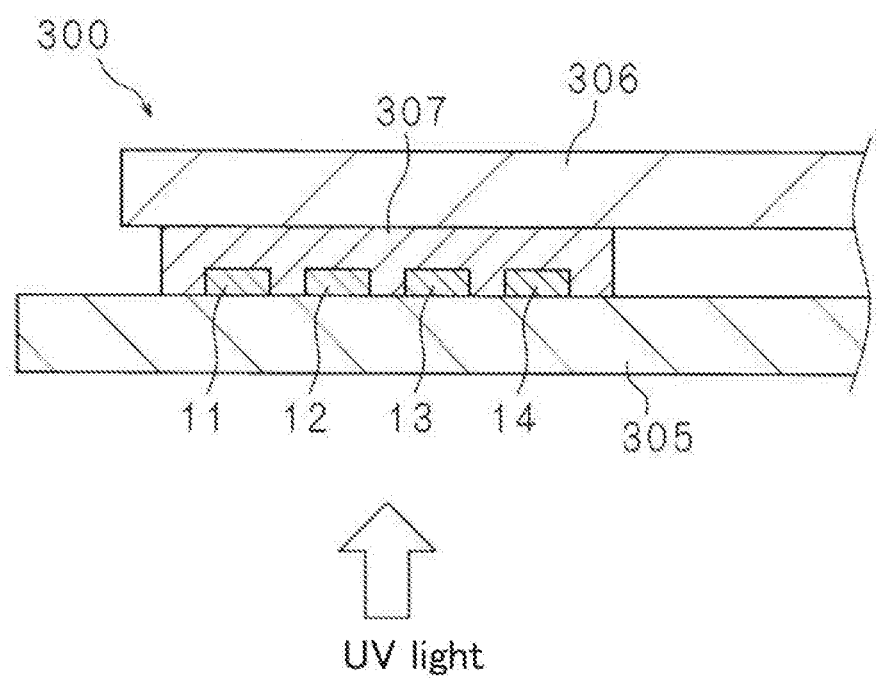
FIG. 6 is a schematic cross-sectional view of a portion of a display panel according to a second embodiment.

In the display panel 300 according to the second embodiment as illustrated in FIG. 6, the TFT substrate 305 and a color filter substrate 306 opposite to the TFT substrate 305 with the liquid crystal layer therebetween are bonded and fixed to each other by an ultraviolet (UV) curable seal section 307.

The seal section 307 is frame-shaped and positioned in the non-display region between the TFT substrate 305 and the color filter substrate 306. The first signal lines 11 to 14 are arranged in positions overlapping with the seal section 307. Through the above, excess space is reduced and bezel narrowing in the display panel 300 can be attempted.

Here, in manufacturing of the display panel 300, the seal section 307 is cured with UV light by irradiating a pre-photocured seal section 307 with UV light in a direction indicated in FIG. 6 after the color filter substrate 306 and the TFT substrate 305 have been placed opposite to each other. By UV curing the seal section 307, the color filter substrate 306 and the TFT substrate 305 are bonded and fixed to each other, and a part surrounded by the seal section 307, the TFT substrate 305, and the color filter substrate 306, which is a part filled with liquid crystal, is sealed. Note that the seal section 307 is not limited to being UV curable so long as the seal section 307 is photocurable. The seal section 307 may be formed by material that is curable by light at wavelengths differing from that of UV light.

Figure 7:
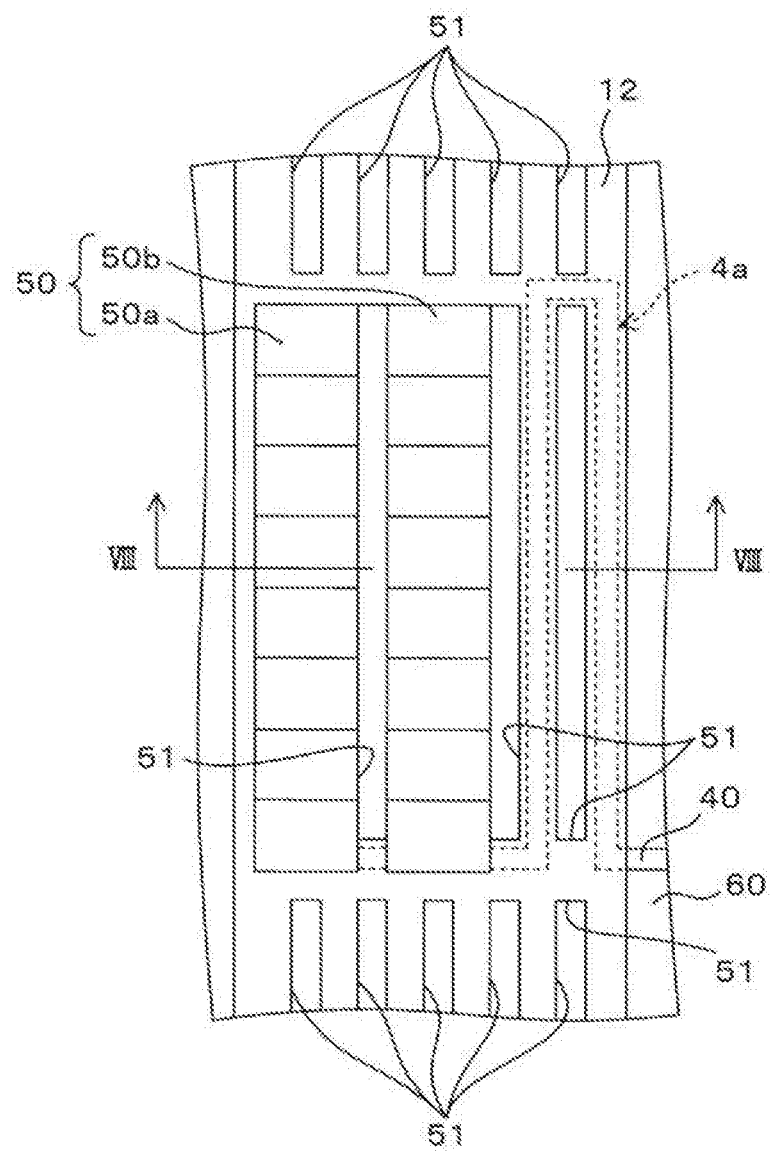
FIG. 7 is a schematic plan view of a connecting part between a first signal line and a second signal line.
Figure 8:
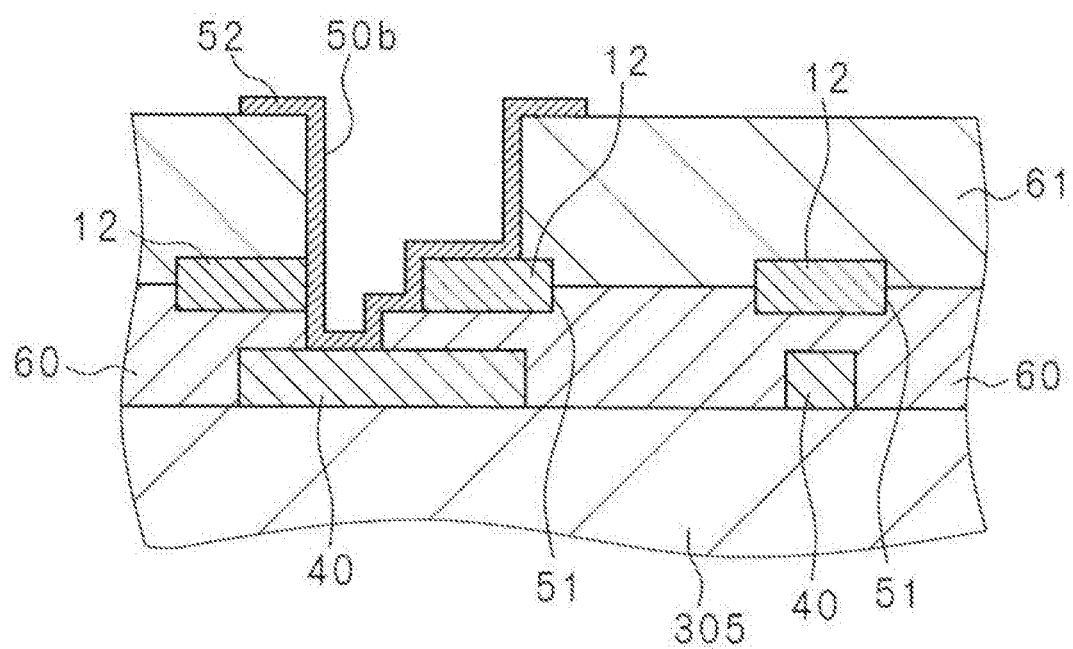
FIG. 8 is a cross-sectional view taken along a VIII-VIII line in FIG. 7.

FIG. 7 is a schematic plan view of a connecting part of the first signal line 12 and a second signal line 40. FIG. 8 is a cross-sectional view taken along a line in FIG. 7. In the following, a part where the first signal line 12 and a second signal line 40 are connected is described as an example, but other parts where the first signal lines 11, 13, and 14 are connected to the second signal lines 40 and 41 are configured in the same manner.

The first signal line 12 has a plurality of slits 51 which are aligned in the row direction and the column direction and extend in the column direction. In FIG. 7, the illustrated slits 51 are aligned in three columns and five rows, but are not limited as such. The slits 51 extend in the direction in which the first signal line 12 extends, that is, the column direction.

A contact hole 50 has two divisions 50a and 50b which extend in the column direction. Each of the divisions 50a and 50b overlaps with a slit 51, and a slit 51 is located between the divisions 50a and 50b.

As illustrated in FIG. 7, a meandering portion 4a of the second signal line 40 meanders so as to avoid a slit 51, that is, so as not to overlap with the opening of the slit 51, and overlaps with the first signal line 12. Accordingly, the meandering portion 4a meanders along the slit 51 and overlaps with an edge portion of the slit 51 in the first signal line 12. The edge portion of the slit 51 is an unopened part of the first signal line 12 on the periphery of the opening of the slit 51.

As illustrated in FIG. 8, the first signal line 12 and the second signal line 40 are opposite to each other with the transparent insulating layer 60 therebetween. An insulating layer 61 (unillustrated in FIG. 7) is layered onto the transparent insulating layer 60 and the first signal line 12. The insulating layer 60 and the insulating layer 61 are positioned over the openings of the slits 51.

As to the position where the contact hole 50 is provided, holes are provided in the insulating layers 60 and 61, and the first signal line 12 and the second signal line 40 are arranged so as to be opposite to each other. In the hole, a conductive member 52 covers the hold and is arranged in contact with the first signal line 12 and the second signal line 40, thus forming the division 50b of the contact hole 50, through which the first signal line 12 and the second signal line 40 conduct electricity. Note that the division 50a has the same structure as the above.

According to the above configuration, UV light can penetrate the slits 51 even in a region where the first signal line 12 is arranged, and UV curing of the seal section 307 can be favorably performed. The meandering portion 4a of the second signal line 40 overlaps with the edge portion of a corresponding slit 51 but does not overlap with the opening of the slit 51. Also, the meandering portion 4a meanders along the slit 51 extending in the column direction so as not to cover the opening of the slit 51. Accordingly, the slits 51 can favorably transmit light. Other parts where the first signal lines 11 to 14 are connected to the second signal lines 40 and 41 are the same as the above.

Furthermore, among the slits 51, the transparent insulating layers 60 and 61 are positioned at the openings of slits 51 other than slits 51 positioned opposite to the divisions 50a and 50b of the contact hole 50. Accordingly, translucence of the slits 51 is guaranteed, and UV curing of the seal section 307 can be favorably performed because UV light can penetrate the slits 51 of the first signal line 12. Other parts where the first signal lines 11 to 14 are connected to the second signal lines 40 and 41 are the same as the above.

Note that the shape of the slits 51 is not limited to a shape that extends in the column direction, and may be another shape such as a circle.

In the first and second embodiments described above, the clock signal GCK is not limited to having four phases and may have for example six or eight phases. In addition, the number of the first signal lines is not limited to four and may be six or eight so as to correspond to the clock signal GCK. Meandering portions may be provided in the same manner on signal lines which connect the shift registers 10 to signal lines which transmit signals other than the GCK clock signals CK1 to CK4.

In addition, the length of the meandering portions 4a is not limited to the aspect in which, of the first signal lines 12 to 14, the farther inward the position of a first signal line is, the longer the length of the meandering portions 4a of the second signal lines 40 and 41 connected to the first signal line are. The length of the meandering portions 4a may be appropriately changed according to for example the type of transmitted signal or the material of the signal line.

Furthermore, in the first and second embodiments, the column direction is equivalent to a first direction and the row direction is equivalent to a second direction. However, the display device 1 and the display panel 300 according to the first and second embodiments may be configured such that the arrangement of the elements of configuration are transposed in the row direction and the column direction, making the row direction the first direction and the column direction the second direction.

As described above, the display panel according to an embodiment of the present disclosure includes: a display region in which a plurality of switching elements is arranged; a plurality of supply circuits arranged side by side in a first direction along a periphery of the display region which supply a scanning signal to the switching elements; a plurality of first signal lines extending in the first direction and arranged side by side in a second direction intersecting with the first direction, which supply prescribed signals to the respective supply circuits; and a plurality of second signal lines which connect the first signal lines to the supply circuits and which supplies the prescribed signals to the respective supply circuits. Some of the second signal lines have meandering portions which meander in parts where the some of the second signal lines overlap with first signal lines of the first signal lines to which the some of the second signal lines are connected.

In the display panel, the resistance difference in the second signal tines is reduced by adjusting the length of the meandering portions. The meandering portions are positioned in parts where the second signal lines with the meandering portions overlap with first signal lines connected to the second signal tines, and a dedicated region where lines meander is not provided between the first signal lines and the supply circuits. Through the above, the elements of the supply circuits can be made large by enlarging a formation region of the supply circuits near the first signal lines, thereby inhibiting degradation of semiconductors. Therefore, occurrence of a display defect in the display panel can be prevented.

In addition, a malfunction does not occur even in a case where a meandering portion and a first signal line have short-circuited because the first signal line and the second signal line with the meandering portion transmit the same signal. Also, a case where a break occurs in a meandering portion can be addressed with a melt connection to the first signal line overlapping with the meandering portion.

In the display panel according to an embodiment of the present disclosure, one of the second signal lines which is connected to a first signal line of the first signal lines located farthest from the supply circuits may be linear, and a remaining second signal line may correspond to the some of the second signal lines having meandering portions.

The length of the meandering portion of one of the second signal tines is adjusted according to the length of the other second signal lines. This can reduce the resistance difference between the second signal lines more favorably.

In the display panel according to an embodiment of the present disclosure, the closer to the supply circuits a position of a first signal line is, the longer a meandering portion of a second signal line of the second signal lines connected to the first signal lines may be.

Because the length of the meandering portions is adjusted according to the distance between the first signal lines and the supply circuits, the resistance difference between the second signal lines can be more favorably reduced.

In the display panel according to an embodiment of the present disclosure, the first signal lines each have a plurality of slits aligned in the first direction and the second direction, and the meandering portions may overlap with the edge portions of the slits in corresponding ones of the first signal lines but do not overlap with the openings of the slits therein.

In a case where the display panel has two substrates which are opposite to each other and fixed by a photocurable fixing member and the position in which the fixing member is arranged overlaps with a position of a first signal line, the slits can be penetrated by light even in a region in Which the first signal line is arranged, and photocuring of the fixing member can be favorably performed. The second signal lines overlap with the edge portions of the slits but do not cover or overlap with the openings of the slits. Therefore, the slits can favorably transmit light.

In the display panel according to an aspect of the present disclosure, the slits may extend in the first direction and the meandering portions may meander along the slits.

The second signal lines meander along the slits that extend in the first direction but do not cover the openings of the slits. Accordingly, the slits can favorably transmit light.

The display device according to an embodiment of the present disclosure includes the above mentioned display panel.

Because the above mentioned display panel is included, the display panel can prevent occurrence of a display defect.

The currently disclosed embodiments are examples in all points, and must not be considered to be limitations. The scope of the present invention is not defined by the above but is indicated by the scope of the claims, and is intended to include all alterations within the scope of the claims and definition equivalent to the scope of the claims. That is, any embodiments obtained by including technical means that have been appropriately altered within the scope indicated by the claims are also included in the technical scope of the present invention.

REFERENCE SIGNS LIST

1 Display device
10 Shift register (supply circuit)
11, 12, 13, 14 First signal line
40, 41 Second signal line
4a Meandering portion
51 Slit
300 Display panel
301 Display region
303 TFT (switching element)

The invention claimed is:

1. A display panel comprising:
a display region in which a plurality of switching elements is arranged;
a plurality of supply circuits arranged side by side in a first direction along a periphery of the display region and configured to supply scanning signals to the switching elements;
a plurality of first signal lines each extending in the first direction, arranged side by side in a second direction intersecting with the first direction, and configured to supply prescribed signals to the supply circuits; and
a plurality of second signal lines each connecting the first signal lines to the supply circuits and configured to supply the prescribed signals to the supply circuits, wherein:
a portion of the plurality of second signal lines have portions which extend in areas where the portion the second signal lines overlap a portion of the plurality of first signal lines to which the portion of the plurality of second signal lines are connected,
each of the plurality of first signal lines has a plurality of slits aligned in the first direction and the second direction, the slits each having a rectangular shape, and
each of the portions of the plurality of second signal lines extends along the slits to pass between the slits, surrounds one of the slits on three sides thereof, and overlaps edge portions of the slits in corresponding ones of the plurality of first signal lines but does not overlap openings of the slits.

2. The display panel according to claim 1, wherein one of the plurality of second signal lines which is connected one of the plurality of first signal lines located farthest from the supply circuits is linear, and a remaining second signal line corresponds to the portion of the plurality of second signal lines having the extending portions.

3. The display panel according to claim 1, wherein the closer to the plurality of supply circuits a first signal line of the plurality of first signal lines is located, the longer an extending portion of a second signal line of the plurality of second signal lines connected to the corresponding first signal line is.

4. A display device comprising the display panel according to claim 1.

5. The display panel according to claim 1, wherein the plurality of slits extend in the first direction, and the extending portions bend repetitively in the first direction.

* * * * *